(12) United States Patent
Gao et al.

(10) Patent No.: US 12,490,179 B2
(45) Date of Patent: Dec. 2, 2025

(54) METHOD FOR SLICE SPECIFIC INFORMATION

(71) Applicant: ZTE CORPORATION, Guangdong (CN)

(72) Inventors: Yuan Gao, Shenzhen (CN); He Huang, Shenzhen (CN); Wenting Li, Shenzhen (CN)

(73) Assignee: ZTE Corporation, Shenzhen (CN)

(*) Notice: Subject to any disclaimer, the term of this patent is extended or adjusted under 35 U.S.C. 154(b) by 386 days.

(21) Appl. No.: 17/868,442

(22) Filed: Jul. 19, 2022

(65) Prior Publication Data
US 2023/0029004 A1    Jan. 26, 2023

Related U.S. Application Data

(63) Continuation of application No. PCT/CN2020/073285, filed on Jan. 20, 2020.

(51) Int. Cl.
*H04W 48/18* (2009.01)
*H04W 48/12* (2009.01)

(52) U.S. Cl.
CPC ........... *H04W 48/18* (2013.01); *H04W 48/12* (2013.01)

(58) Field of Classification Search
None
See application file for complete search history.

(56) References Cited

U.S. PATENT DOCUMENTS

| | | | |
|---|---|---|---|
| 11,611,912 B2 * | 3/2023 | Han | H04W 4/06 |
| 2018/0199273 A1 | 7/2018 | Chun | |
| 2018/0324602 A1 | 11/2018 | Griot et al. | |
| 2018/0324645 A1 | 11/2018 | Park et al. | |
| 2019/0223094 A1 * | 7/2019 | Ingale | H04W 68/005 |
| 2019/0289528 A1 | 9/2019 | Lou et al. | |
| 2020/0059987 A1 * | 2/2020 | Hong | H04W 36/0033 |
| 2020/0120547 A1 | 4/2020 | Han et al. | |
| 2020/0120548 A1 | 4/2020 | Jin et al. | |
| 2021/0084582 A1 | 3/2021 | Li | |
| 2021/0250819 A1 * | 8/2021 | Yang | H04W 76/27 |

FOREIGN PATENT DOCUMENTS

| | | |
|---|---|---|
| CN | 106851589 A | 6/2017 |
| CN | 107223350 A | 9/2017 |
| CN | 108347736 A | 7/2018 |
| CN | 109151940 A | 1/2019 |
| CN | 109246775 A | 1/2019 |

(Continued)

OTHER PUBLICATIONS

Extended European Search Report for EP Appl. No. 20887200.2, dated Aug. 9, 2023 (14 pages).

(Continued)

*Primary Examiner* — Hong S Cho
(74) *Attorney, Agent, or Firm* — Foley & Lardner LLP

(57) ABSTRACT

Method, systems and devices for slice specific and/or access category specific information. The present disclosure provides wireless communication method for use in a wireless terminal and the wireless communication method comprises receiving, from a wireless network node, cell selection information associated with at least one network slice or with at least one access category, and selecting a cell based on the cell selection information.

8 Claims, 8 Drawing Sheets

(56) References Cited

FOREIGN PATENT DOCUMENTS

| | | | | |
|---|---|---|---|---|
| CN | 109257827 | A | 1/2019 | |
| CN | 109964509 | A | 7/2019 | |
| CN | 110268753 | A | 9/2019 | |
| CN | 110662261 | A | 1/2020 | |
| EP | 3570574 | A1 * | 11/2019 | ......... H04L 41/0803 |
| EP | 3 589 064 | A1 | 1/2020 | |
| EP | 3852434 | B1 * | 8/2024 | ............ H04W 24/08 |
| JP | 2019-519993 | A | 7/2019 | |
| JP | 2019-526211 | A | 9/2019 | |
| WO | WO-2017/157118 | A1 | 9/2017 | |
| WO | WO-2018/137637 | A1 | 8/2018 | |
| WO | WO-2018195825 | A1 * | 11/2018 | ........ H04W 36/0061 |
| WO | WO-2018/228294 | A1 | 12/2018 | |
| WO | WO-2020/001171 | A1 | 1/2020 | |

OTHER PUBLICATIONS

OPPO, "Discussion on Several Issues for Network Slicing", 3GPP TSG-RAN WG2 #99bis, R2-1710174, Oct. 13, 2017, Prague, Czech Republic, (3 pages).
Spreadtrum Communications, "Cell Reselection Based on Slice Information", 3GPP TSG-RAN WG2 #99, R2-1709331, Aug. 25, 2017, Berlin, Germany (3 pages).
CATT, "Cell selection and re-selection based on slice" 3GPP TSG-RAN WG2 #99, R2-1707893, Aug. 21, 2017, Berlin, Germany (2 pages).
International Search Report and Written Opinion for PCT Appl. No. PCT/CN2020/073285, mailed Oct. 22, 2020 (9 pages).
First Office Action for CN Appl. No. 202410327408.3, dated Aug. 29, 2024 (with English translation, 10 pages).
Huawei et al., "Slice Availability for Cell Reselection", 3GPP TSG-RAN WG2 Meeting#101, R2-1802261, Mar. 2, 2018, Athens, Greece (4 pages).
Notice of Grounds of Rejection for JP Appl. No. 2022-543758, dated Nov. 21, 2023 (with English translation, 11 pages).
Zte et al., "Service based cell reselection in idle mode and inactive state", 3GPP TSG-RAN WG2 Meeting#101bis, R2-1804453, Apr. 20, 2018, Sanya, China (4 pages).
First Office Action for CN Appl. No. 202080093182.5, dated Sep. 5, 2024 (with English translation, 23 pages).
Communication pursuant to Article 94(3) EPC for EP Appl. No. 20887200.2, dated Apr. 15, 2025 (10 pages).
Examination Report No. 2 for AU Appl. No. 2020381558, dated Apr. 4, 2025 (3 pages).
Office Action for KR Appl. No. 10-2022-7028638, dated May 27, 2025 (with English translation, 7 pages).
Communication pursuant to Article 94(3) EPC for EP Appl. No. 20887200.2, dated Sep. 11, 2025 (11 pages).
Ericsson, "Dedicated System Information", 3GPP TSG-RAN WG2 #101, Tdoc R2-1802317, Mar. 2, 2018, Athens, Greece (3 pages).
Examination Report No. 4 for AU Appl. No. 2020381558, dated Sep. 5, 2025 (4 pages).
Notice of Grounds of Rejection for JP Appl. No. 2024-173325, dated Sep. 9, 2025 (with English translation, 11 pages).
Office Action for ID Appl. No. P00202208897, dated Aug. 21, 2025 (with English translation, 6 pages).
ZTE Corporation et al., "Discussion on RAN Slicing", 3GPP TSG RAN Meeting #86, RP-192576, Dec. 12, 2019, Sitges, Spain (2 pages).

* cited by examiner

| Slice/Service Type | Value of SST field | Characteristics |
|---|---|---|
| eMBB | 1 | Slice suitable for handling of enhanced Mobile Broadband |
| URLLC | 2 | Slice suitable for handling of ultra- reliable low latency communications |
| MIot | 3 | Slice suitable for handling of massive IoT |
| V2X | 4 | Slice suitable for handling of V2X services |

Pr: Preamble
SSB: Synchronization signal block
SI: system information message

Pr: Preamble
SSB: Synchronization signal block

Pr: Preamble
SSB: Synchronization signal block

| Preamble Mask Index | Slice specific preamble(s) of SSB |
|---|---|
| 0 | All |
| 1 | Every even preambles |
| 2 | Every odd preambles |

Pr: Preamble
SSB: Synchronization signal block

Pr: Preamble
SSB: Synchronization signal block

| PRACH Mask Index | Allowed PRACH occasion(s) of SSB |
|---|---|
| 0 | All |
| 1 | PRACH occasion index 1 |
| 2 | PRACH occasion index 2 |
| 3 | PRACH occasion index 3 |
| 4 | PRACH occasion index 4 |
| 5 | PRACH occasion index 5 |
| 6 | PRACH occasion index 6 |
| 7 | PRACH occasion index 7 |
| 8 | PRACH occasion index 8 |
| 9 | Every even PRACH occasion |
| 10 | Every odd PRACH occasion |
| 11 | Reserved |
| 12 | Reserved |
| 13 | Reserved |
| 14 | Reserved |
| 15 | Reserved |

FIG. 13

Pr: Preamble
SSB: Synchronization signal block

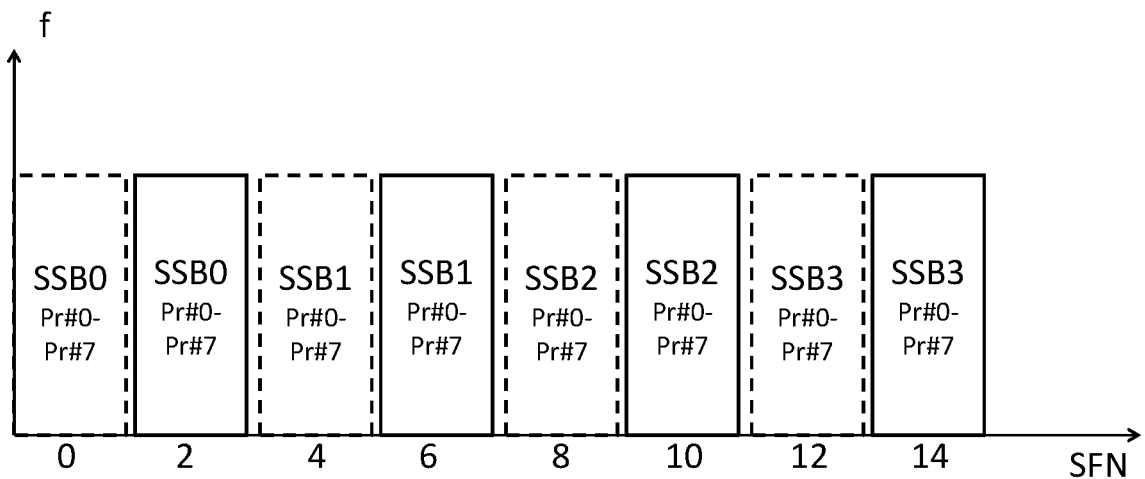

FIG. 14

METHOD FOR SLICE SPECIFIC INFORMATION

CROSS-REFERENCE TO RELATED APPLICATION

This application claims the benefit of priority under 35 U.S.C. § 120 as a continuation of PCT Patent Application No. PCT/CN2020/073285, filed on Jan. 20, 2020, the disclosure of which is incorporated herein by reference in its entirety.

TECHNICAL FIELD

This document is directed generally to wireless communications.

SUMMARY

Network Slicing is a concept to allow differentiated treatment depending on each customer requirements and has been introduced in new radio (NR). With network slicing, it is possible for mobile network operators (MNOs) to consider customers as belonging to different tenant types with different service requirements that govern in terms of what slice types each tenant is eligible to use based on a service level agreement (SLA) and subscriptions.

FIG. 1 shows a communication process among a user equipment (UE), a random access network (RAN) node (e.g. a next generation RAN (NG-RAN) node) and an access and mobility management function (AMF). In FIG. 1, after the UE selects a cell, initiates a random access and sets up a radio resource control (RRC) connection based on system information received from the RAN node, the UE will provide S-NSSAI(s) to RAN node to help the RAN node to select an appropriate AMF. Following the initial access, the establishment of the RRC connection and the selection of the correct AMF, the AMF establishes a complete UE context by sending an initial context setup request message to the RAN node over an interface between the node RAN and the core network (e.g. NG-C). The initial context setup request message contains allowed S-NSSAI and additionally contains the S-NSSAI(s) as part of packet data unit (PDU) session(s) resource description in the initial context setup request message. Upon successful establishing the UE context and allocating PDU session resources to the relevant network slice(s), the RAN node responds the AMF with an initial context setup response message. One S-NSSAI is added per PDU session to be established, so the RAN node is enabled to apply policies at PDU session level according to the SLA represented by the network slices, while still being able to apply (for example) differentiated quality-of-service (QoS) within the network slices.

However, the system information in FIG. 1 does not provide information specific designed for the network slices. Under such a condition, the UE performs a cell selection and/or a cell reselection without considering the information of the network slices. As a result, the UE may select and initiate random access to a cell belonging to an inappropriate network slice which is not preferred by the network (NW) for this UE and may get rejected several times before finding the most appropriate cell.

In order to solve the abovementioned issue, the present disclosure provides a method for providing slice specific information.

This document relates to methods, systems, and devices for providing slice specific information, and more particularly to methods, systems, and devices for slice specific configurations and/or parameters.

The present disclosure relates to a wireless communication method for use in a wireless terminal. The wireless communication method comprises:

receiving, from a wireless network node, cell selection information associated with at least one network slice or with at least one access category, and selecting a cell based on the cell selection information.

Various embodiments may preferably implement the following features:

Preferably, the at least one network slice is a plurality of network slices and comprises network slices supported by the wireless network node.

Preferably, the cell selection information indicates a single network slice selection assistance information, S-NSSAI, of each of the at least one network slice.

Preferably, the cell selection information comprises a slice/service type, SST, filed of the S-NSSAI of each of the at least one network slice.

Preferably, the cell selection information comprises a plurality of most significant bits, MSBs, of the S-NSSAI of each of the at least one network slice.

Preferably, at least one S-NSSAI of the at least one network slice is categorized by a plurality of S-NSSAI groups and the cell selection information indicates at least one of the plurality of S-NSSAI groups.

Preferably, the at least one network slice is a plurality of network slices and comprises all of network slices supported by the wireless network node.

Preferably, the at least one network slice requires a fast access.

Preferably, the cell selection information comprises a physical cell identification, PCI, range of cells which support the network slices configured as allowed network slices for the wireless terminal.

Preferably, the cell selection information comprises at least one cell reselection priority associated to the at least one network slice or the at least one access category.

Preferably, the at least one reselection priority is configured per network slice.

Preferably, the cell selection information comprises at least one of an S-NSSAI, an SST field of the S-NSSAI or a plurality of MSBs of the S-NSSAI of network slices corresponding to the at least one reselection priority.

Preferably, the at least one network slice is categorized by a plurality of network slice groups and the at least one reselection priority is configured per network slice group.

Preferably, the cell selection information comprises one of a group ID or a list of the network slice groups corresponding to the at least one reselection priority configured per network slice group.

Preferably, at least one reselection priority is configured per access category.

Preferably, at least one reselection priority is configured per access category group.

Preferably, the cell is selected based on a default cell reselection priority corresponding to one of a network slice, a network slice group, an access category or an access category group in the at least one cell reselection priority.

Preferably, the cell is selected based on a specific cell reselection priority in the at least one reselection priority and the specific cell reselection priority is corresponding to one of a network slice, a network slice group, an access category group or an access category used by the wireless terminal in a period before selecting the cell.

Preferably, the cell selection information is in one of system information or a radio resource control, RRC, signaling.

Preferably, the cell selection information is in a system information block, SIB or dedicated RRC message.

Preferably, the cell selection information of a serving cell of the wireless terminal is in system information block 1, SIB1.

Preferably, the cell selection information of a neighbor cell of the wireless terminal is in a SIB other than SIB1.

Preferably, the cell selection information is in an RRC release message.

The present disclosure relates to a wireless communication method for use in a wireless communication node. The wireless communication method comprises:

transmitting, to a wireless terminal, cell selection/reselection information associated with at least one network slice or with at least one access category.

Various embodiments may preferably implement the following features:

Preferably, the at least one network slice is a plurality of network slices and comprises network slices supported by the wireless network node.

Preferably, the cell selection information indicates a single network slice selection assistance information, S-NSSAI, of each of the at least one network slice.

Preferably, the cell selection information comprises a slice/service type, SST, filed of the S-NSSAI of each of the at least one network slice.

Preferably, the cell selection information comprises a plurality of most significant bits, MSBs, of the S-NSSAI of each of the at least one network slice.

Preferably, at least one S-NSSAI of the at least one network slice is categorized by a plurality of S-NSSAI groups and the cell selection information indicates at least one of the plurality of S-NSSAI groups.

Preferably, the at least one network slice is a plurality of network slices and comprises all of network slices supported by the wireless network node.

Preferably, the at least one network slice requires a fast access.

Preferably, the cell selection information comprises a physical cell identification, PCI, range of cells which support the network slices configured as allowed network slices for the wireless terminal.

Preferably, the cell selection information comprises at least one cell reselection priority associated to the at least one network slice or the at least one access category.

Preferably, the at least one reselection priority is configured per network slice.

Preferably, the cell selection information comprises at least one of an S-NSSAI, an SST field of the S-NSSAI or a plurality of MSBs of the S-NSSAI of network slices corresponding to the at least one reselection priority.

Preferably, the at least one network slice is categorized by a plurality of network slice groups and the at least one reselection priority is configured per network slice group.

Preferably, the cell selection information comprises one of a group ID or a list of the network slice groups corresponding to the at least one reselection priority configured per network slice group.

Preferably, at least one reselection priority is configured per access category.

Preferably, at least one reselection priority is configured per access category group.

Preferably, the cell is selected based on a default cell reselection priority corresponding to one of a network slice, a network slice group, an access category or an access category group in the at least one cell reselection priority.

Preferably, the cell is selected based on a specific cell reselection priority in the at least one reselection priority and the specific cell reselection priority is corresponding to one of a network slice, a network slice group, an access category or an access category group used by the wireless terminal in a period before selecting the cell.

Preferably, the cell selection information is in one of system information or a radio resource control, RRC, signaling.

Preferably, the cell selection information is in a system information block, SIB or dedicated radio resource control, RRC, message.

Preferably, the cell selection information of a serving cell of the wireless terminal is in system information block 1, SIB1.

Preferably, the cell selection information of a neighbor cell of the wireless terminal is in a SIB other than SIB1.

Preferably, the cell selection information is in an RRC release message.

The present disclosure relates to a wireless communication method for use in a wireless terminal. The wireless communication method comprises:

receiving, from a wireless network node, resource information associated with at least one network slice or with at least one access category, and performing a random access procedure based on the resource information.

Various embodiments may preferably implement the following features:

Preferably, the resource information is configured for at least one of the at least one network slice, at least one network slice group associated with at least one network slice, at least one access category or at least one access category group.

Preferably, the resource information indicates random access channel, RACH, resources of the random access procedure.

Preferably, the resource information comprises at least one of specific prach-ConfigurationIndex, msg1-FDM, msg1-FrequencyStart, zeroCorrelationZoneConfig, preambleReceivedTargetPower, preambleTransMax, powerRampingStep, or ra-ResponseWindow.

Preferably, the resource information indicates at least one search space for the random access procedure.

Preferably, the resource information indicates a portion of common RACH resources of the random access procedure.

Preferably, the at least one network slice is categorized by a plurality of network slice groups and each of the plurality of network slice groups is corresponding to specific resource information in the resource information.

Preferably, the at least one network slice is categorized by a first network slice group or a second network slice group and each of network slices in the first network slice group is corresponding to specific resource information in the resource information.

Preferably, the network slices in the first network slice group require fast access.

Preferably, the at least one access category or at least one access category group associated with at least one access category is corresponding to specific resource information in the resource information.

Preferably, the at least one network slice is categorized by a first access category or a second access category and each of network slices in the first access category is corresponding to specific resource information in the resource information.

Preferably, the network slices in the first access category require fast access.

Preferably, the resource information indicates one-to-one mappings between resources indicated by the resource information of the random access procedure and one of the at least one network slice, at least one network slice group, at least one access category or at least one access category group.

Preferably, the resource information indicates associations between resources indicated by the resource information and one of the at least one network slice, at least one network slice group, at least one access category or at least one access category group.

Preferably, the resources indicated by the resource information and one of the at least one network slice, the at least one network slice group, the at least one access category or the at least one access category group are associated by associating preambles or random access channel occasions (ROs) of the resources indicated by the resource information and one of the at least one network slice, the at least one network slice group, the at least one access category or the at least one access category group.

Preferably, the resource information indicates a preamble start index and the number of consecutive preambles.

Preferably, the resource information indicates a preamble start index and a step number.

Preferably, the resource information indicates a preamble mask corresponding to a predefined set of preambles in the preambles of the resources indicated by the resource information.

Preferably, the random access procedure is performed based on default cell resource information corresponding to one of a network slice, a network slice group, an access category or an access category group in the received resource information.

Preferably, the random access procedure is performed based on a specific resource information in the received resource information and the specific resource information is corresponding to one of a network slice, a network slice group, an access category or an access category group used by the wireless terminal in a period before selecting the cell.

Preferably, the resource information is in one of system information or an RRC signaling.

The present disclosure relates to a wireless communication method for use in a wireless network node. The wireless communication method comprises:

transmitting, to a wireless terminal, resource information associated with at least one network slice.

Various embodiments may preferably implement the following features:

Preferably, the resource information is configured for at least one of the at least one network slice, at least one network slice group associated with at least one network slice, at least one access category or at least one access category group.

Preferably, the resource information indicates random access channel, RACH, resources of the random access procedure.

Preferably, the resource information comprises at least one of specific prach-ConfigurationIndex, msg1-FDM, msg1-FrequencyStart, zeroCorrelationZoneConfig, preambleReceivedTargetPower, preambleTransMax, powerRampingStep, or ra-ResponseWindow.

Preferably, the resource information indicates at least one search space for the random access procedure.

Preferably, the resource information indicates a portion of common RACH resources of the random access procedure.

Preferably, wherein the at least one network slice is categorized by a plurality of network slice groups and each of the plurality of network slice groups is corresponding to specific resource information in the resource information.

Preferably, the at least one network slice is categorized by a first network slice group or a second network slice group and each of network slices in the first network slice group is corresponding to specific resource information in the resource information.

Preferably, the network slices in the first network slice group require fast access.

Preferably, the at least one access category or at least one access group associated with at least one access category is corresponding to specific resource information in the resource information.

Preferably, the at least one network slice is categorized by a first access category or a second access category and each of network slices in the first access category is corresponding to specific resource information in the resource information.

Preferably, the network slices in the first access category require fast access.

Preferably, the resource information indicates one-to-one mappings between resources indicated by the resource information of the random access procedure and one of the at least one network slice, at least one network slice group, at least one access category or at least one access category group.

Preferably, the resource information indicates associations between resources indicated by the resource information and one of the at least one network slice, at least one network slice group, at least one access category or at least one access category group.

Preferably, the resources indicated by the resource information and one of the at least one network slice, the at least one network slice group, the at least one access category or the at least one access category group are associated by associating preambles or random access channel occasions (ROs) of the resources indicated by the resource information and one of the at least one network slice, the at least one network slice group, the at least one access category or the at least one access category group.

Preferably, the resource information indicates a preamble start index and the number of consecutive preambles.

Preferably, the resource information indicates a preamble start index and a step number.

Preferably, the resource information indicates a preamble mask corresponding to a predefined set of preambles in the preambles of the resources indicated by the resource information.

Preferably, the random access procedure is performed based on default cell resource information in the received resource information.

Preferably, the random access procedure is performed based on specific resource information in the received resource information and the specific resource information is corresponding to one of a network slice or an access category used by the wireless terminal in a period before selecting the cell.

Preferably, the resource information is in one of system information or an RRC signaling.

The present disclosure relates to a wireless communication method for use in a wireless network node. The wireless communication method comprises:

receiving an aggregate maximum data rate associated with at least one network slice, and performing a data rate control based on the aggregate maximum data rate.

Various embodiments may preferably implement the following features:

Preferably, the aggregate maximum data rate associated with the at least one network slice is received from a core network.

Preferably, the aggregate maximum data rate associated with the at least one network slice is in at least one of INITIAL CONTEXT SETUP REQUEST, PDU SESSION RESOURCE SETUP REQUEST, PDU SESSION RESOURCE MODIFY REQUEST or HANDOVER REQUEST.

Preferably, the aggregate maximum data rate associated with the at least one network slice is received from a gNB.

Preferably, the aggregate maximum data rate associated with the at least one network slice is in at least one of HANDOVER REQUEST, S-NODE ADDITION REQUEST, S-NODE MODIFICATION REQUEST or RETRIEVE UE CONTEXT RESPONSE.

Preferably, the aggregate maximum data rate associated with the at least one network slice is in at least one inter-node radio resource control, RRC, message.

Preferably, the at least one inter-node RRC message comprises at least one of HandoverCommand, HandoverPreparationInformation, CG-Config or CG-ConfigInfo.

Preferably, the aggregate maximum data rate associated with the at least one network slice is received from a gNB-centralized-unit, gNB-CU and the wireless network node is a gNB-distributed-unit, gNB-DU.

Preferably, the aggregate maximum data rate associated with the at least one network slice is in at least one of UE CONTEXT SETUP REQUEST or UE CONTEXT MODIFICATION REQUEST.

The present disclosure relates to a wireless terminal. The wireless terminal comprises:

a communication unit, configured to receive, from a wireless network node, cell selection/reselection information associated with at least one network slice or with at least one access category, and a processor, configured to select a cell based on the cell selection information.

Various embodiments may preferably implement the following feature:

Preferably, the processor is further configured to perform a wireless communication method of any of the foregoing described methods.

The present disclosure relates to a wireless network node. The wireless network node comprises:

a communication unit, configured to transmit, to a wireless terminal, cell selection/reselection information associated with at least one network slice or with at least one access category.

Various embodiments may preferably implement the following feature:

Preferably, the wireless network node further comprises a processor which is configured to perform a wireless communication method of any of the foregoing described methods.

The present disclosure relates to a wireless terminal. The wireless terminal comprises:

a communication unit, configured to receive, from a wireless network node, resource information associated with at least one network slice or with at least one access category, and a processor, configured to perform a random access procedure based on the resource information.

Various embodiments may preferably implement the following feature:

Preferably, the processor is further configured to perform a wireless communication method of any of the foregoing described methods.

The present disclosure relates to a wireless network node. The wireless network node comprises:

a communication unit, configured to transmit, to a wireless terminal, resource information associated with at least one network slice or with at least one access category.

Various embodiments may preferably implement the following feature:

Preferably, the wireless network node further comprises a processor which is configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

BRIEF DESCRIPTION OF THE DRAWINGS

FIG. 13 shows an example of a table of the occasion mask according to an embodiment of the present disclosure.

FIG. 14 shows an example of associations between a portion of the common ROs and one of the network slice(s), network slice group(s), access category(s) or access category group(s).

DETAILED DESCRIPTION

Figure 1:
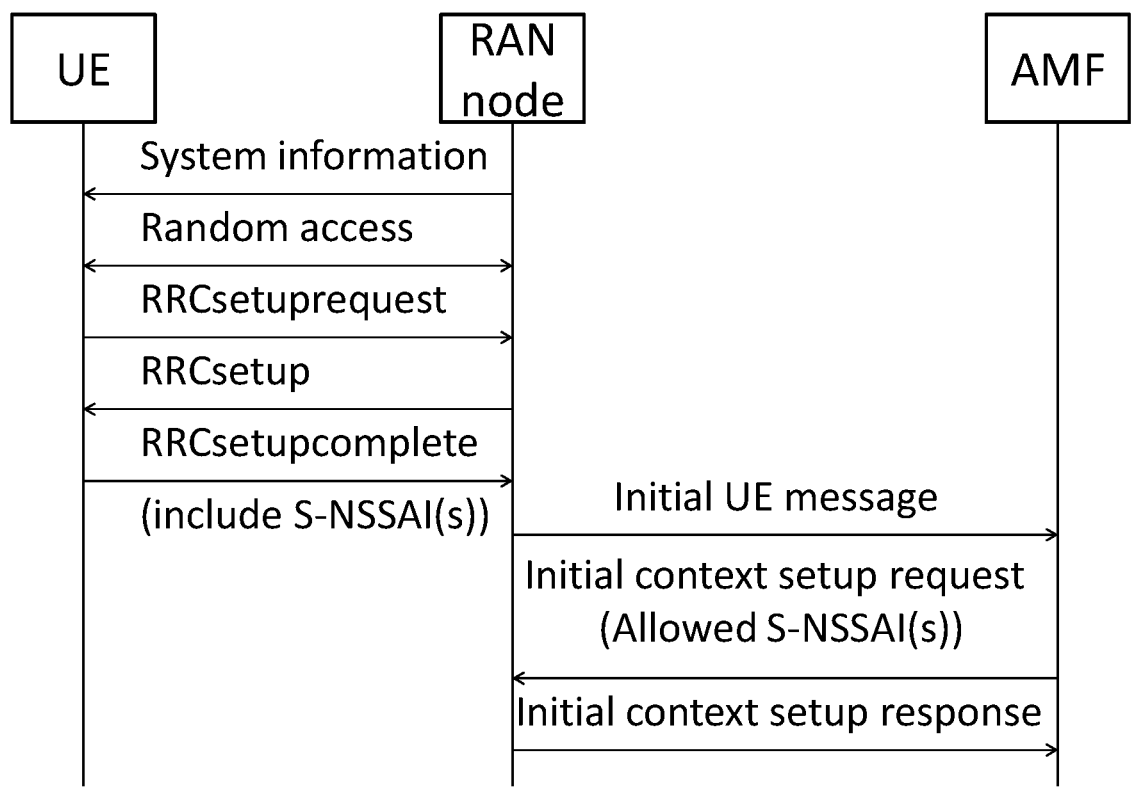
FIG. 1 shows a process among a user equipment, a random access network node and an access and mobility management function.
Figure 2:
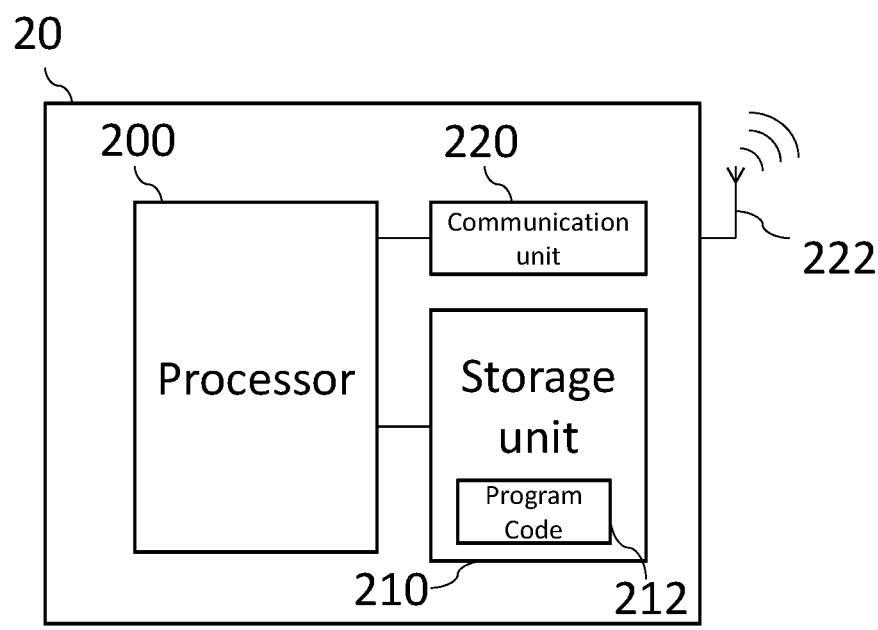
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
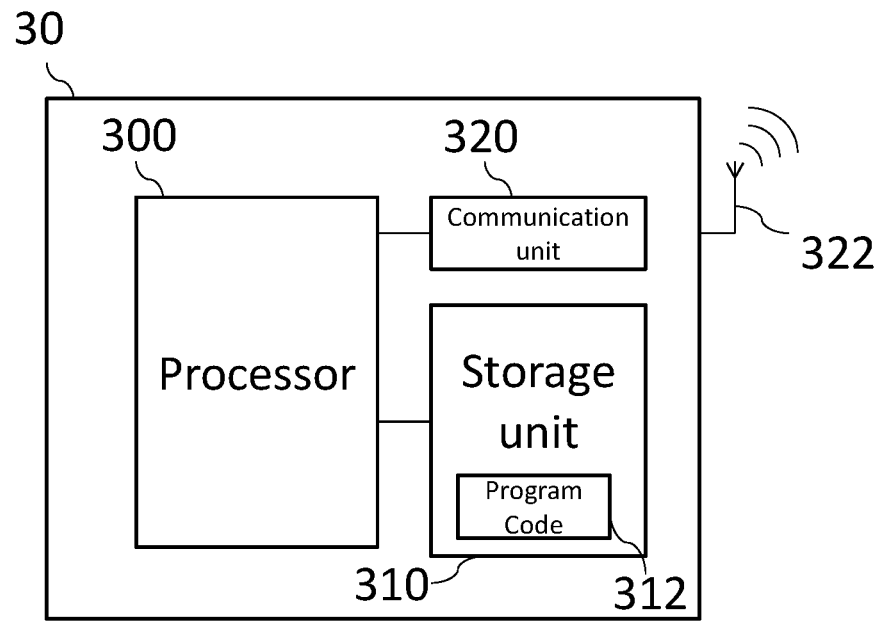
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

Figure 4:
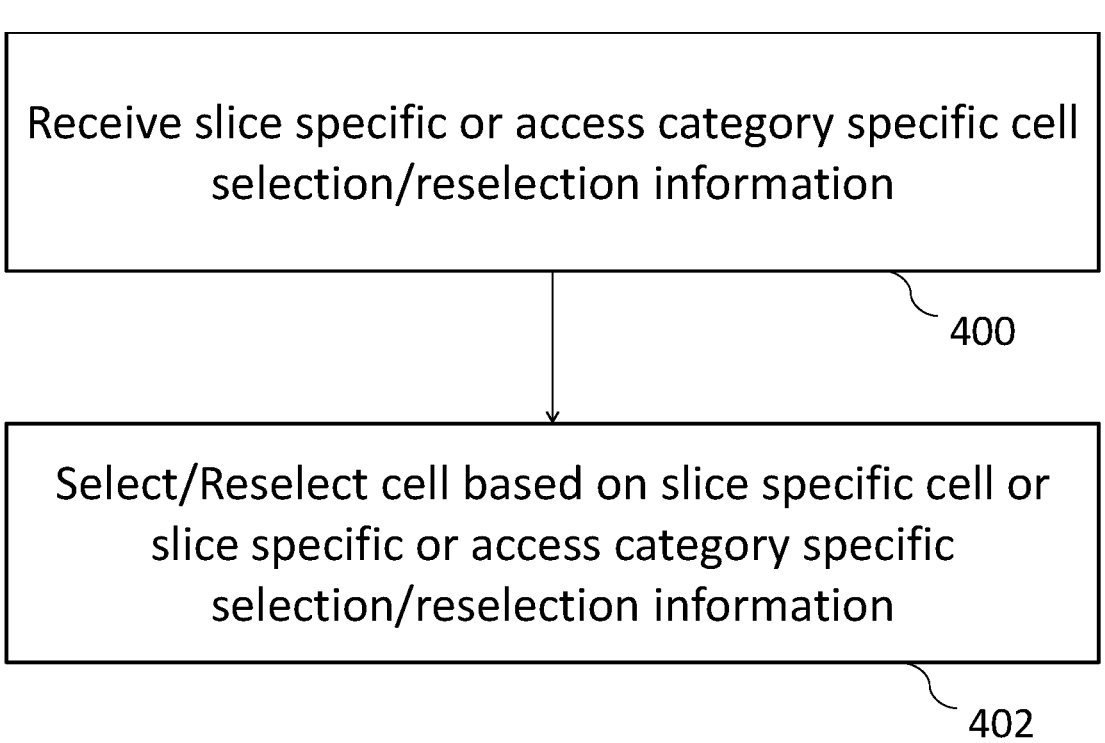
FIG. 4 shows an example of a process according to an embodiment of the present disclosure.

FIG. 4 shows an example of a process according to an embodiment of the present disclosure. The process shown in FIG. 4 may be used in a UE and comprise the following steps:

Step 400: Receive slice specific or access category specific cell selection/reselection information.

Step 402: Select/Reselect a cell based on the slice specific or access category specific cell selection/reselection information.

More specifically, the UE receives, from a NG-RAN (i.e. a wireless network node), the slice specific or access category specific cell selection/reselection information associated with network slice(s) and/or with access category(s) (step 400). Based on the received slice specific or access category specific cell selection/reselection information, the UE selects/reselects a cell, e.g., by performing a cell selection/reselection procedure (step 402). Because considering the slice specific or access category specific cell selection/reselection information associated with the at least one network slice and/or with at least one access category when selecting/reselecting the cell, the UE is able to determine the cell belonging to an appropriate network slice which is preferred by the network (NW) (e.g. core network (CN)). In other words, the UE is able to achieve a fast access to the cell supporting the intended network slice and a slice specific or access category specific data rate control of the NW based on the slice specific or access category specific cell selection/reselection information associated with the network slice(s) and/or the access category(s).

Note that, in the following, the cell selection may also represent the cell reselection for brevity, and vice versa. Similarly, "select" may also mean "reselect" in the following, and vice versa.

In an embodiment, the slice specific or access category specific cell selection information provides information comprises network slice(s) supported by the wireless network node. For example, during a NG setup procedure, the NG-RAN may provide supported single network slice selection assistance information (S-NSSAIs) per tracking area (TA) to the AMF and the AMF may response to the NG-RAN its supported S-NSSAIs per public land mobile network (PLMN). Note that, each network slice is uniquely identified by the NSSAI including one or a list of S-NSSAI(s) and a S-NSSAI is a combination of:

mandatory slice/service type (SST) field, which identifies the slice type and consists of 8 bits (with range is 0-255); and optional slice differentiator (SD) field, which differentiates among slices with same SST field and consists of 24 bits.

Figures 5, 6:
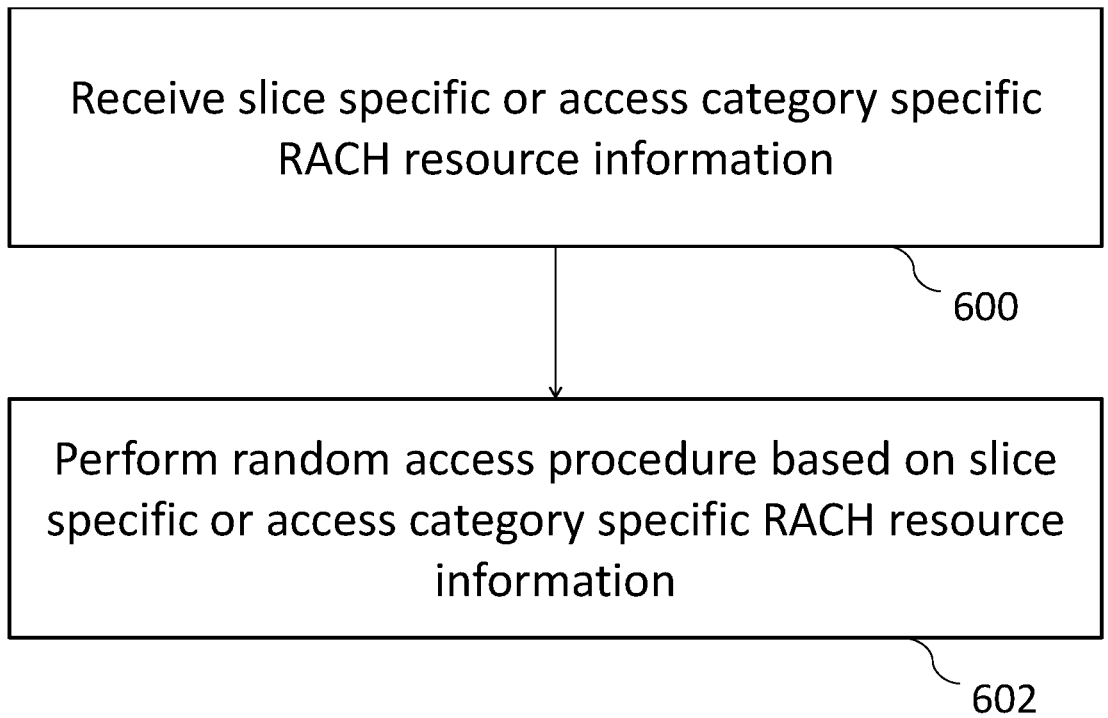
FIG. 5 shows a table of standardized values of the SST field according to an embodiment of the present disclosure.
FIG. 6 shows a process according to an embodiment of the present disclosure.

FIG. 5 shows a table of standardized values of the SST field according to an embodiment of the present disclosure. In FIG. 5, when the value of the SST field is 1, the SST field represents network slice(s) suitable for the handling of enhanced mobile broadband (eMBB). When the value of the SST field is 2, the SST field represents network slice(s) suitable for the handling of ultra-reliable low latency communications (URLLC). When the value of the SST field is 3, the SST field represents network slice(s) suitable for the handling of massive internet-of-things (IoT). When the value of the SST field is 4, the SST field represents network slice(s) suitable for the handling of vehicle-to-everything (V2X) services.

After the NG setup procedure, the NG-RAN is aware of the supported S-NSSAIs at both the RAN side and the CN side, making the NG-RAN being able to transmit (e.g. broadcast) the S-NSSAIs supported by the NG-RAN as the cell selection information. However, the number of S-NSSAIs supported by single RAN node may be tremendous and each S-NSSAI requires 40 bits in signaling (e.g. 8 bits for the SST field and 24 bits for the SD field). If the NG-RAN is required to transmit (e.g. broadcast) the supported S-NSSAIs to the UE, the signaling overhead would become an issue as the maximum size of system information block 1 (SIB1) or a system information (SI) message is 2976 bits.

In an embodiment, the cell selection information comprises the SST field in the S-NSSAI of each network slice. That is, the NG-RAN may broadcast the SST field (e.g. 8 bits) rather than the full S-NSSAI (e.g. 32 bits) for each S-NSSAI supported by the NG-RAN.

In an embodiment, the cell selection information comprises several most significant bits (MSBs) (e.g. 2 to 7 bits) of the S-NSSAI for each S-NSSAI supported by the NG-RAN.

In an embodiment, the S-NSSAI(s) of the network slice(s) may be categorized by (e.g. divided to or classified into) S-NSSAI groups and the cell selection information indicates at least one of the S-NSSAI groups for indicating the network slice(s) supported by the NG-RAN. For example, the cell selection information may comprise group identification(s) of the S-NSSAI group(s) with the network slice(s) supported by the NG-RAN.

In an embodiment, the cell selection information provides the information (e.g. indicates) all of the network slices supported by the NG-RAN.

In an embodiment, the cell selection information provides the information of (e.g. indicates) network slice(s) requiring fast access in the network slice(s) supported by the NG-RAN. For example, the network slice requiring the fast access may have the SST filed with the value 2 (SST=2). That is, the network slice requiring the fast access may be configured for handling of ultra-reliable low latency communications. In an embodiment, the cell selection information indicating the network slice requiring fast access by broadcasting the S-NSSAI, the SST field, several MSBs (e.g. 2-7 bits) of the S-NSSAI or a group ID of a S-NSSAI group.

In an embodiment, some assistance information (e.g. the S-NSSAIs, the SST field, several MSBs (e.g. 2-7 bits) of the full 32-bit S-NSSAI or group ID) can be provided from the network (e.g. CN) to the NG-RAN to help the NG-RAN to differentiate the slices requiring the fast access. In an embodiment, the assistance information can be provided from the network to the NG-RAN node during the NG setup procedure.

In an embodiment, the cell selection information comprises a physical cell identification (PCI) range of cells which support the network slices configured as allowed network slices for the UE.

In an embodiment, the cell selection information comprises at least one slice specific or access category specific cell reselection priority. For example, the cell reselection priority may be associated to the network slice(s) and/or the access category(s).

In an embodiment, multiple cell reselection priorities may be broadcasted and each reselection priority is configured per network slice, per network slice group, per access category, or per access category group, wherein the network slice(s) may be categorized by a plurality of network slice groups and the access categories(s) may be categorized by a plurality of access category groups.

In an embodiment of the reselection priority being configured per network slice, the cell selection information may comprise at least one of the S-NSSAI, the SST filed of the S-NSSAI or several MSBs (e.g. 2-7 bits) of the S-NSSAI, and a corresponding reselection priority.

In an embodiment of the reselection priority being configured per network slice group, the cell selection information may comprise a group ID of the corresponding network slice group or a list of S-NSSAIs categorized in the corresponding network slice group and the corresponding reselection priority.

In an embodiment of the reselection priority being configured per access category, the cell selection information may comprise the access category and the corresponding reselection priority.

In an embodiment of the reselection priority being configured per access category group, the cell selection information may comprise an access category group ID of the corresponding access category group and the corresponding reselection priority.

In an embodiment of the UE receiving multiple cell reselection priorities, the UE may utilize (e.g. apply) a specific one of the received cell reselection priorities for selecting the cell.

In an embodiment, the UE applies a default cell reselection priority associated with at least one of a network slice, a network slice group, an access category group or an access category in the received cell reselection priorities for selecting the cell. For example, the default cell reselection priority may be predefined or configured by the NG-RAN.

In an embodiment, the UE applies the cell reselection priority corresponding to a recently used network slice, network slice group, access category or access category group for selecting the cell. For example, the recently used network slice, network slice group, access category or access category group may be the network slice, network slice group, access category or access category group used by the UE in a period before selecting the cell. In another example, the recently used network slice, network slice group, access category or access category group is the latest network slice, network slice group, access category or access category group used by the UE. In still another example, the recently used network slice, network slice group, access category or access category group is the most recently used network slice, network slice group, access category or access category group.

In an embodiment, how to transmit the cell selection information should be considered.

In an embodiment, the cell selection information is (included) in the SI (e.g. SIB).

In an embodiment, the cell selection information is (included) in a radio resource control (RRC) signaling (e.g. dedicated RRC message). For example, the cell selection information is in an RRC release message.

In an embodiment, the cell selection information corresponding to a serving cell is (included) in SIB1 because the information related to cell access is included in SIB1.

In an embodiment, the cell selection information corresponding to a neighbor cell is (included) in the SIB other than SIB1. For example, when the neighbor cell is an intra-frequency neighbor cell, the cell selection information corresponding to the neighbor cell is included in SIB2. In another example, when the neighbor cell is an inter-frequency neighbor cell, the cell selection information corresponding to the neighbor cell is included in SIB4. In still another example, when the neighbor cell is an inter-radio-access-technology (inter-RAN) neighbor cell, the cell selection information corresponding to the neighbor cell is included in SIB5. In yet another example, the cell selection information corresponding to all of neighbor cells is included in a newly introduced SIB and the NG-RAN may provide (e.g. transmit or broadcast) this newly introduced SIB on demand. In an embodiment, the cell selection information is provided per frequency.

FIG. 6 shows a process according to an embodiment of the present disclosure. The process shown in FIG. 6 may be used in a UE and comprise the following steps:

Step 600: Receive slice specific or access category specific random access channel (RACH) resource information.

Step 602: Perform a random access procedure based on the slice specific or access category specific RACH resource information.

Specifically, based on FIG. 6, the UE receives the slice specific or access category specific RACH resource information (e.g. resource configurations and/or resource parameters) from the NW (e.g. RAN) (step 600). Based on the received slice specific or access category specific RACH resource information, the UE performs the random access procedure, e.g., by using the RACH resources indicated by the slice specific or access category specific RACH resource information (step 604).

In an embodiment, the slice specific or access category specific RACH resource information is configured for at least one of the network slice(s), network slice group(s) associated with the network slice(s), access category(s) or at least one access category group.

In an embodiment, the slice specific or access category specific RACH resource information may comprise specific prach-ConfigurationIndex, msg1-FDM, msg1-FrequencyStart, zeroCorrelationZoneConfig, preambleReceivedTargetPower, preambleTransMax, powerRampingStep, and/or raResponseWindow configured per network slice, network slice group, access category, and/or access category group.

In an embodiment, the slice specific or access category specific RACH resource information may comprise (e.g. indicate) a specific search space ra-SearchSpace (e.g. an ID of the search space for random access procedure) can be configured for a network slice, a network slice group, an access category or an access category group.

In an embodiment, the slice specific or access category specific RACH resource information may indicate a portion of common RACH resources (RACH occasions and/or preambles) allocated for a network slice, a network slice group, an access category, or an access category group. Note that, the common RACH resources are the RACH resources broadcast in the SI and be used by all the UEs to perform the random access procedure. A portion of the common RACH resource can be allocated for a network slice, a network slice group, an access category, or an access category group based on configurations from the NW. Further details would be discussed in the following. The common RACH resources can be divided into common RACH occasions (ROs) in frequency and time domain and common preambles in preamble domain.

In an embodiment, the specific RACH resource is another RACH resource in frequency domain, timer domain and/or preamble domain which is different from the common RACH resource. The specific RACH resources can be divided into specific ROs in frequency and time domain and specific preambles in preamble domain.

In an embodiment, a specific RACH configuration(s) or parameter(s) in the slice specific RACH resource information may be linked to a network slice or a network slice group.

In an embodiment, the network slices supported by the RAN may be divided into (e.g. categorized by) a plurality of network slice groups and each of the plurality of network slice groups is linked to a slice specific RACH resource configuration(s) and/or parameter(s).

In an embodiment, the network slices supported by the RAN may be divided into two network slice groups NSG1 and NSG 2. For the network slice group NSG 1, a slice specific RACH resource configuration(s) and/or parameter(s) is configured for each network slices or all of the network slices in the network slice group NSG 1. In an example, no slice specific RACH resource configuration and/or parameters is provided for the network slice group NSG 2.

In an embodiment, the network slice group NSG 1 comprises frequently used network slice(s) and the network slice group NSG 2 comprises the remaining network slices.

In an embodiment, the network slice group NSG 1 comprises the network slice(s) requiring the fast access and the network slice group NSG 2 comprises the remaining network slices. For example, the network slice requiring the fast access may have the SST filed with the value 2 (SST=2).

In an embodiment, a specific RACH configuration(s) or parameter(s) of the access category specific RACH resource information may be linked to an access category or an access category group.

In an embodiment, the access categories supported by the RAN may be divided into (e.g. categorized by) a plurality of access category groups and each of the plurality of access category groups is linked to an access category specific RACH resource configuration(s) and/or parameter(s).

In an embodiment, the access categories may be divided into two the access category groups ACG1 and ACG2. For the access category group ACG1, an access category specific RACH resource configuration(s) and/or parameter(s) is configured for each access category or all of the access categories in the access category group ACG1. In an example, no access category specific RACH resource configuration and/or parameters is provided for the access category group ACG1.

In an embodiment, the access category group ACG1 comprises frequently used access category(s) and the access category group ACG2 comprises the remaining network slices.

In an embodiment, the access category group ACG1 comprises the access category(s) requiring the fast access and the access category group ACG2 comprises the remaining network slices.

In an embodiment, the access category/access category group/network slice/network slice group (e.g. network slice group NSG1 or access category group ACG1) is associated with a portion of the common RACH resources (e.g. RACH occasions and/or preambles) or specific RACH resources.

In an embodiment, similar to the RACH resource configuration for msg1 based SI request, a portion of the common RACH resource (RACH occasions and/or preambles)/specific RACH resource (RACH occasions and/or preambles) may be associated to network slice/network slice group/access category/access category group by introducing slice-SpecificPeriod/slicegroup-SpecificPeriod/accessCategory-SpecificPeriod/accessCategoryGroup-SpecificPeriod and slice-SpecificResources/slicegroup-SpecificResources/accessCategory-SpecificResources/accessCategoryGroup-SpecificResources.

Figure 7:
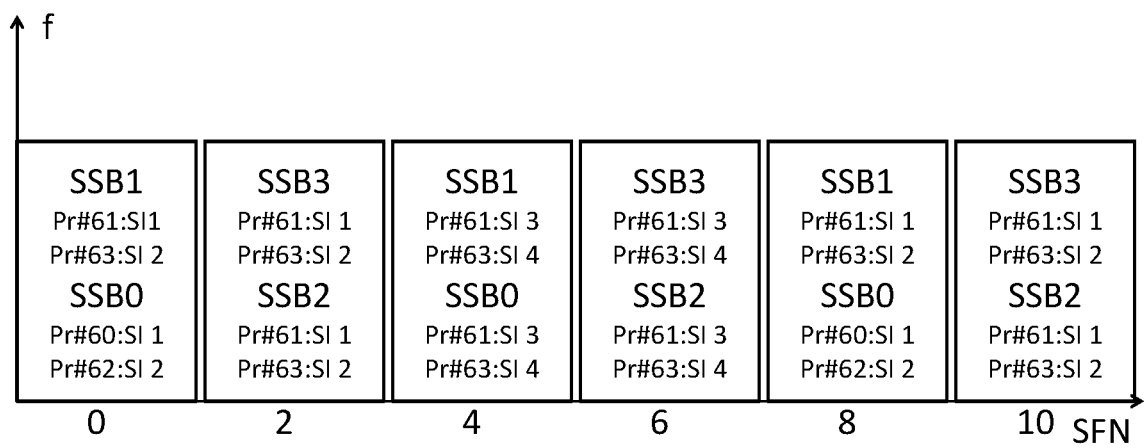
FIG. 7 shows an example of random access channel (RACH) resource configuration for msg1 based SI request according to an embodiment of the present disclosure.

FIG. 7 shows an example of RACH resource configuration for msg1 based SI request according to an embodiment of the present disclosure, wherein the horizontal axis relates to sub-frame number (SFN) and the vertical axis relates to frequency. The related parameters of the embodiment shown in FIG. 7 are shown below:

K=4 (number of SI messages that can be requested on-demand)
NTOT=4 (total number of SSBs)
ssb-perRACH-Occasion: N=2
PRACH configuration Index=12 (PRACH configuration period=2 radio frames)
Msg1-FDM=1
Association period=2 (number of PRACH configuration period)

If, for instance, si-RequestPeriod is set to 2 (in number of association periods):

The number of SI requests to be served in each PRACH configuration period is K×NTOT/(si-RequestPeriod*Association period)=(4*4)/(2*2)=4

The number of RACH occasions in each PRACH configuration period is 1 (i.e. Msg1-FDM)

=>The number of SI requests to be served in each RACH occasion is 4

=>The number of preambles needed for SI requests is equal to 4

Based on the above parameters, the following configuration for the different SI requests could be set:

For on-demand SI message 1: ra-PreambleStartIndex=60, ra-AssociationPeriodIndex=0;

For on-demand SI message 2: ra-PreambleStartIndex=62, ra-AssociationPeriodIndex=0;

For on-demand SI message 3: ra-PreambleStartIndex=60, ra-AssociationPeriodIndex=1; and For on-demand SI message 4: ra-PreambleStartIndex=62, ra-AssociationPeriodIndex=1.

In an embodiment, the one-to-one mapping between a portion of the common RACH resource (RACH occasions and/or preambles)/specific RACH resource (RACH occasions and/or preambles) may be associated to network slice(s) by:

```
    slice-SpecificPeriod           ENUMERATED {one, two, four, six,
eight, ten, twelve, sixteen}       OPTIONAL,  -- Need R //Periodicity of the slice specific
configuration in number of association periods.
    slice-SpecificResources                    SEQUENCE (SIZE
(1..maxnumberofslice)) OF   Slice-SpecificResources //the maximum size is the maximum number
of slice when the RACH resource is configured per slice
    Slice-SpecificResources ::=        SEQUENCE {
       ra-PreambleStartIndex              INTEGER (0..63),//If N SSBs are
associated with a RACH occasion, where N > = 1, for the i-th SSB (i=0, •••, N-1) the preamble
with preamble index = ra-PreambleStartIndex + i is used for random access to the corresponding
slice; For N < 1, the preamble with preamble index = ra-PreambleStartIndex is used for random
access to the corresponding slice.
       ra-AssociationPeriodIndex           INTEGER (0..15)
OPTIONAL,  -- Need R //Index of the association period in the slice-SpecificPeriod in which the
UE can initiate random access to a specific slice corresponding to this slice-SpecificResources,
using the preambles indicated by ra-PreambleStartIndex and rach occasions indicated by
ra-ssb-OccasionMaskIndex.
       ra-ssb-OccasionMaskIndex           INTEGER (0..15)
OPTIONAL   -- Need R
```

Figure 8:
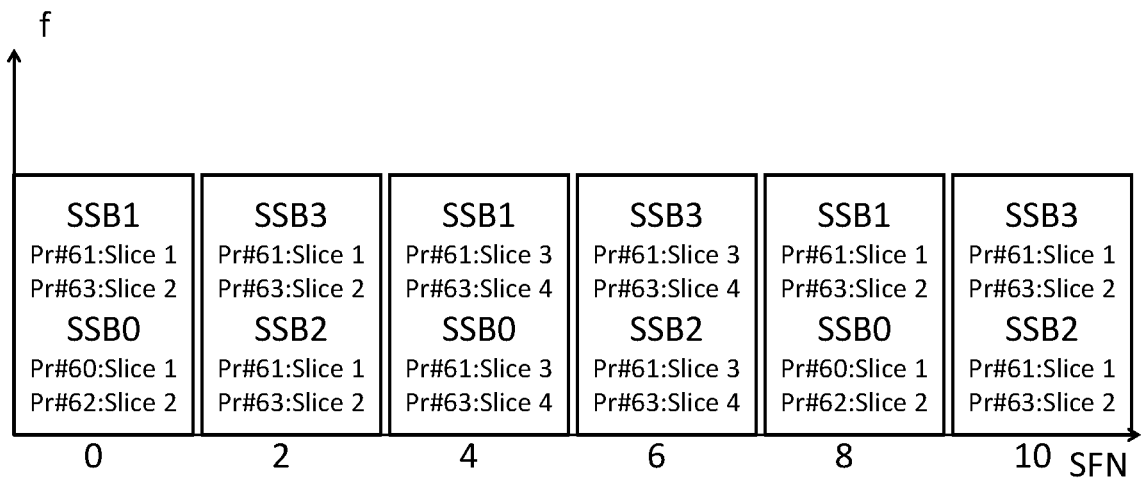
FIG. 8 shows an example of one-to-one mapping between a portion of the common RACH resource/specific RACH resource and the network slices according to an embodiment of the present disclosure.

FIG. 8 shows an example of one-to-one mapping between a portion of the common RACH resource (RACH occasions and/or preambles)/specific RACH resource (RACH occasions and/or preambles) and the network slices, wherein the related parameters are shown below:

K=4 (number of slices which are configured with specific RACH resource)
NTOT=4 (total number of SSBs)
ssb-perRACH-Occasion: N=2
PRACH configuration Index=12 (PRACH configuration period=2 radio frames)
Msg1-FDM=1
Association period=2 (number of PRACH configuration period)

If, for instance, slice-SpecificPeriod is set to 2 (in number of association periods):

The number of slices to be served in each PRACH configuration period is K×NTOT/(siRequestPeriod*Association period)=(4*4)/(2*2)=4

The number of RACH occasions in each PRACH configuration period is 1 (i.e. Msg 1-FDM)

=>The number of slices to be served in each RACH occasion is 4

=>The number of preambles needed for slices is equal to 4

The following configuration for the different slices could be set as the following and associations between the preambles of and the network slices are as shown in FIG. 8:

For slice 1: ra-PreambleStartIndex=60, ra-AssociationPeriodIndex=0

For slice 2: ra-PreambleStartIndex=62, ra-AssociationPeriodIndex=0

For slice 3: ra-PreambleStartIndex=60, ra-AssociationPeriodIndex=1

For slice 4: ra-PreambleStartIndex=62, ra-AssociationPeriodIndex=1

In an embodiment, the one-to-one mapping between a portion of the common RACH resource (RACH occasions and/or preambles)/specific RACH resource (RACH occasions and/or preambles) may be associated to network slice group(s) by:

```
    slicegroup-SpecificPeriod            ENUMERATED {one, two, four,
six, eight, ten, twelve, sixteen}        OPTIONAL,  -- Need R //Periodicity of the slice group
specific configuration in number of association periods.
    slicegroup-SpecificResources             SEQUENCE (SIZE
(1..maxnumberofslicegroup)) OF   Slicegroup-SpecificResources //the maximum size is the
maximum number of slice group when the RACH resource is configured per slice group
    Slicegroup-SpecificResources ::=        SEQUENCE {
        ra-PreambleStartIndex            INTEGER (0..63),//If N SSBs are
associated with a RACH occasion, where N > = 1, for the i-th SSB (i=0, •••, N-1) the preamble
with preamble index = ra-PreambleStartIndex + i is used for random access to the corresponding
slice group; For N < 1, the preamble with preamble index = ra-PreambleStartIndex is used for
random access to the corresponding slice group.
        ra-AssociationPeriodIndex                INTEGER (0..15)
OPTIONAL,  -- Need R //Index of the association period in the slicegroup-Specific in which the
UE can initiate random access to a specific slice group corresponding to this
slicegroup-SpecificResources, using the preambles indicated by ra-PreambleStartIndex and rach
occasions indicated by ra-ssb-OccasionMaskIndex.
        ra-ssb-OccasionMaskIndex                INTEGER (0..15)
OPTIONAL  -- Need R
```

In an embodiment, the one-to-one mapping between a portion of the common RACH resource (RACH occasions and/or preambles)/specific RACH resource (RACH occasions and/or preambles) may be associated to access category(s) by:

```
    accessCategory-SpecificPeriod           ENUMERATED {one, two,
four, six, eight, ten, twelve, sixteen}      OPTIONAL,  -- Need R //Periodicity of the access
category specific configuration in number of association periods.
    accessCategory-SpecificResources             SEQUENCE (SIZE
(1..maxAccessCatForSlice)) OF   AccessCategory-SpecificResources
    AccessCategory-SpecificResources ::=       SEQUENCE {
        ra-PreambleStartIndex            INTEGER (0..63),//If N SSBs are
associated with a RACH occasion, where N > = 1, for the i-th SSB (i=0, •••, N-1) the preamble
with preamble index = ra-PreambleStartIndex + i is used for random access for the corresponding
access category; For N < 1, the preamble with preamble index = ra-PreambleStartIndex is used for
random access for the corresponding access category.
        ra-AssociationPeriodIndex                INTEGER (0..15)
OPTIONAL,  -- Need R //Index of the association period in the accessCategory-SpecificPeriod
in which the UE can initiate random access for a specific access category corresponding to this
accessCategory-SpecificcResources, using the preambles indicated by ra-PreambleStartIndex and
rach occasions indicated by ra-ssb-OccasionMaskIndex.
        ra-ssb-OccasionMaskIndex                INTEGER (0..15)
OPTIONAL  -- Need R
```

In an embodiment, the one-to-one mapping between a portion of the common RACH resource (RACH occasions and/or preambles)/specific RACH resource (RACH occasions and/or preambles) may be associated to access category group(s) by:

```
    accessCategoryGroup-SpecificPeriod           ENUMERATED {one,
two, four, six, eight, ten, twelve, sixteen}     OPTIONAL,  -- Need R //Periodicity of the
access category group specific configuration in number of association periods.
    accessCategoryGroup-SpecificResources             SEQUENCE (SIZE
(1..maxAccessCatGroupForSlice)) OF   AccessCategoryGroup-SpecificResources
```

```
AccessCategoryGroup-SpecificResources ::=        SEQUENCE {
    ra-PreambleStartIndex                        INTEGER (0..63),//If N SSBs are
associated with a RACH occasion, where N > = 1, for the i-th SSB (i=0, •••, N-1) the preamble
with preamble index = ra-PreambleStartIndex + i is used for random access for the corresponding
access category group; For N < 1, the preamble with preamble index = ra-PreambleStartIndex is
used for random access for the corresponding access category group.
    ra-AssociationPeriodIndex                    INTEGER (0..15)
OPTIONAL,   -- Need R //Index of the association period in the
accessCategoryGroup-SpecificPeriod in which the UE can initiate random access for a specific
access category corresponding to this accessCategoryGroup-SpecificcResources, using the
preambles indicated by ra-PreambleStartIndex and rach occasions indicated by
ra-ssb-OccasionMaskIndex.
    ra-ssb-OccasionMaskIndex                     INTEGER (0..15)
OPTIONAL   -- Need R
```

In an embodiment, the slice specific or access category specific RACH resource information indicates associations between resources indicated by the slice specific or access category specific RACH resource information and one of the network slice(s), network slice group(s), access category(s) or access category group(s).

In an embodiment, specific RACH resources or a portion of common RACH resources (RACH occasions and/or preambles) may be associated to one of the network slice(s), network slice group(s), access category(s) or access category group(s).

In an embodiment, specific preambles or a portion of the common preambles may be associated to one of the network slice(s), network slice group(s), access category(s) or access category group(s).

Figures 9, 10:
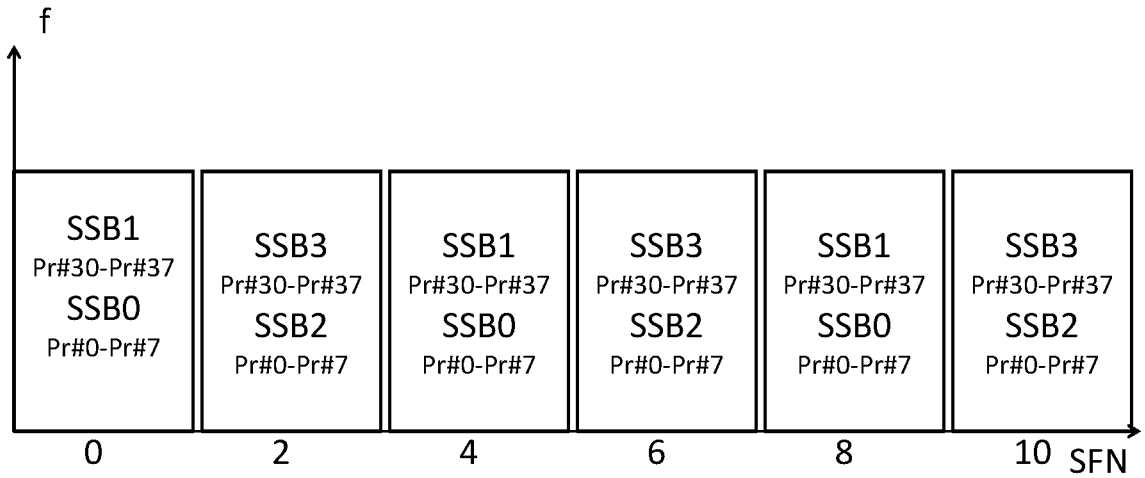
FIG. 9 shows an example of common RACH resource configuration according to an embodiment of the present disclosure.
FIG. 10 shows an example of a table of the preamble mask according to an embodiment of the present disclosure.

FIG. 9 shows an example of common RACH resource configuration according to an embodiment of the present disclosure, wherein the related parameters are shown as following:
  NTOT=4 (total number of SSBs)
  ssb-perRACH-Occasion: N=2
  CB-PreamblesPerSSB: R=8
  PRACH configuration Index=12 (PRACH configuration period=2 radio frames)
  Msg1-FDM=1
  totalNumberOfRA-Preambles: $N_{preamble}^{total}$=60

In an embodiment, the specific slice RACH resource information may comprise (e.g. indicate) a preamble start index (e.g. ra-PreambleStartIndex) and the number of consecutive preambles, for indicating associations between the specific preambles or a portion of the common preambles and one of the network slice(s), network slice group(s), access category(s) or access category group(s). For example, preambles 0-3 and 31-34 (i.e. the preambles with indexes 0 to 3 and 31 to 34) of each SSB shown in FIG. 9 can be reserved for a specific network slice, network slice group, access category or access category group by the following configuration:
  ra-PreambleStartIndex=0 and the number of consecutive preambles=4; and
  ra-PreambleStartIndex=31 and the number of consecutive preambles=4

In an embodiment, the specific slice RACH resource information may comprise (e.g. indicate) a preamble start index and a step number, for indicating associations between the specific preambles or a portion of the common preambles and one of the network slice(s), network slice group(s), access category(s) or access category group(s). For example, preambles 0 2 4 6 and 31 33 35 37 of each SSB shown in FIG. 9 may be reserved for the specific network slice, network slice group, access category or access category group with the following configuration:
  ra-PreambleStartIndex=0 and 31, step=2

In an embodiment, the specific slice RACH resource information may comprise (e.g. indicate) a preamble mask index which is utilized for indicating an preamble mask of configuring associations between the specific preambles or a portion of the common preambles and one of the network slice(s), network slice group(s), access category(s) or access category group(s). FIG. 10 shows an example of a table of the preamble mask according to an embodiment of the present disclosure. Based on the table shown in FIG. 10, preambles 0 2 4 6 and 30 32 34 36 of each SSB shown in FIG. 9 may be reserved a specific network slice(s), network slice group(s), access category(s) or access category group(s) by configuring the preamble mask index=1.

In an embodiment, specific occasions (e.g. RACH occasions) or a portion of the common occasions may be associated to one of the network slice(s), network slice group(s), access category(s) or access category group(s).

Figure 11:
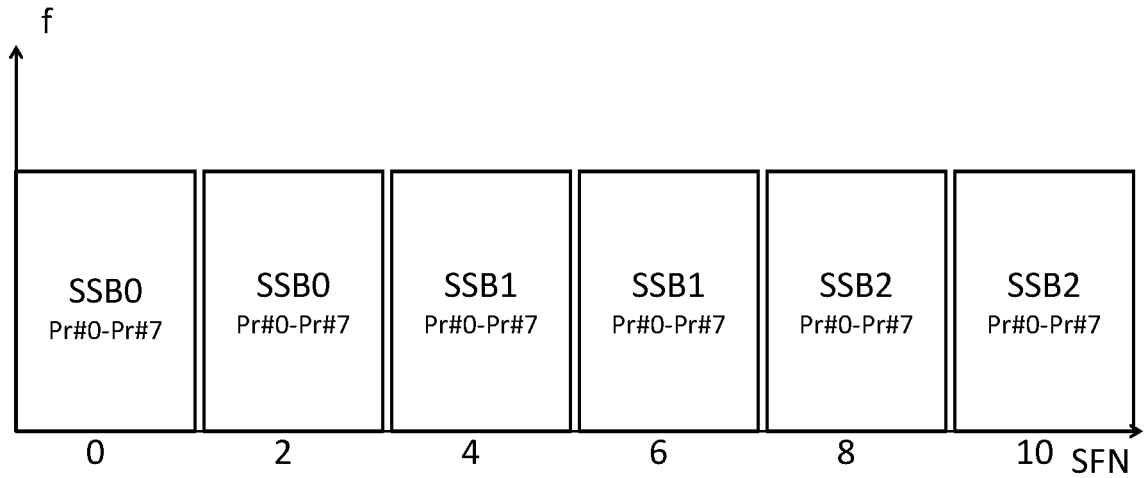
FIG. 11 shows an example of a common RACH resource configuration according to an embodiment of the present disclosure.

FIG. 11 shows an example of a common RACH resource configuration according to an embodiment of the present disclosure, wherein the related parameters are shown as following:
  NTOT=4 (total number of SSBs)
  ssb-perRACH-Occasion: N=½
  CB-PreamblesPerSSB: R=8
  PRACH configuration Index=12 (PRACH configuration period=2 radio frames)
  Msg1-FDM=1
  totalNumberOfRA-Preambles: $N_{preamble}^{total}$=60

In an embodiment, the specific slice RACH resource information may comprise (e.g. indicate) an occasion list (e.g. ra-OccasionList) per network slice/network slice group/access category/access category group, for indicating associations between the specific occasions or a portion of the common occasions and one of the network slice(s), network slice group(s), access category(s) or access category group(s).

Figure 12:
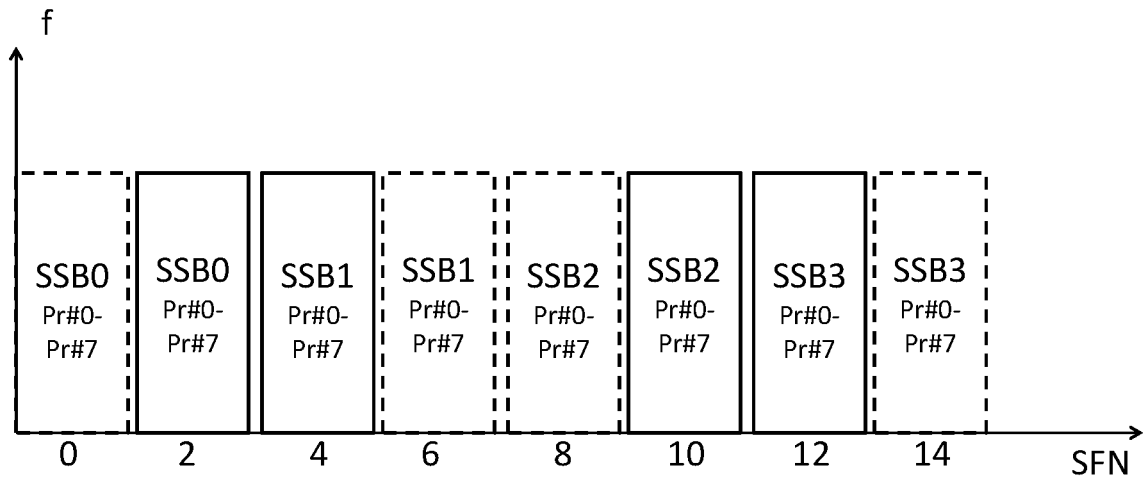
FIG. 12 shows an example of associations between a portion of the common RACH occasions and one of the network slice(s), network slice group(s), access category(s) or access category group(s).

In an embodiment, ASN.1 coding of the occasion list may be shown as following:
  Association period=8*PRACH configuration period
  Association pattern period=1 Association period FIG. 12 shows an example of associations between a portion of the common ROs and one of the network slice(s), network slice group(s), access category(s) or access category group(s). In FIG. 12, the ROs corresponding to sub-frame numbers 0, 6, 8 and 14 (i.e. the ROs marked by dashed lines) are preserved for the specific network slice, network slice group, access category or access category group with the following configuration:

SSB #0: ra-OccasionList: #0
SSB #1: ra-OccasionList: #3
SSB #2: ra-OccasionList: #4
SSB #3: ra-OccasionList: #7

In an embodiment, the specific slice RACH resource information may comprise (e.g. indicate) an occasion mask index, for indicating an occasion mask configuring the associations between the specific occasions or a portion of the common occasions and one of the network slice(s), network slice group(s), access category(s) or access category group(s).

FIG. 13 shows an example of a table of the occasion mask according to an embodiment of the present disclosure. According to the table shown in FIG. 13, every even ROs can be reserved for a specific network slice(s), network slice group(s), access category(s) or access category group(s) by configuring the occasion mask index with the value 9.

FIG. 14 shows an example of associations between a portion of the common ROs and one of the network slice(s), network slice group(s), access category(s) or access category group(s). In FIG. 14, the occasion mask index is configured with value 9. Thus, the ROs marked by dashed lines are preserved for the specific network slice, network slice group, access category or access category group.

In an embodiment, the UE receiving multiple slice specific or access category specific RACH resource information (e.g. specific RACH resource configuration and/or parameters), the UE may utilize (e.g. apply) a specific one of the slice specific or access category specific RACH resource information for performing the random access procedure.

In an embodiment, the UE utilizes default slice specific or access category specific RACH resource information associated with at least one of a network slice, a network slice group, an access category and an access category group of received slice specific RACH resource information for performing the random access procedure.

In an embodiment, the UE utilizes slice specific or access category specific RACH resource information corresponding to recently used network slice, slice group, access category or access category group for performing the random access procedure. For example, the recently used network slice, slice group, access category or access category group may be the network slice, slice group, access category or access category group used by the UE in a period before selecting the cell. In another example, the recently used network slice, slice group, access category or access category group is the latest network slice, slice group, access category or access category group used by the UE. In still another example, the recently used network slice, slice group, access category or access category group is the most recently used network slice, slice group, access category or access category group.

In an embodiment, when the slice specific or access category specific RACH resource information is not provided to the UE, the UE initiates the random access based on the common RACH resources and parameters.

In an embodiment, the slice specific or access category specific RACH resource information is (included) in one of system information or an RRC signaling.

Figure 15:
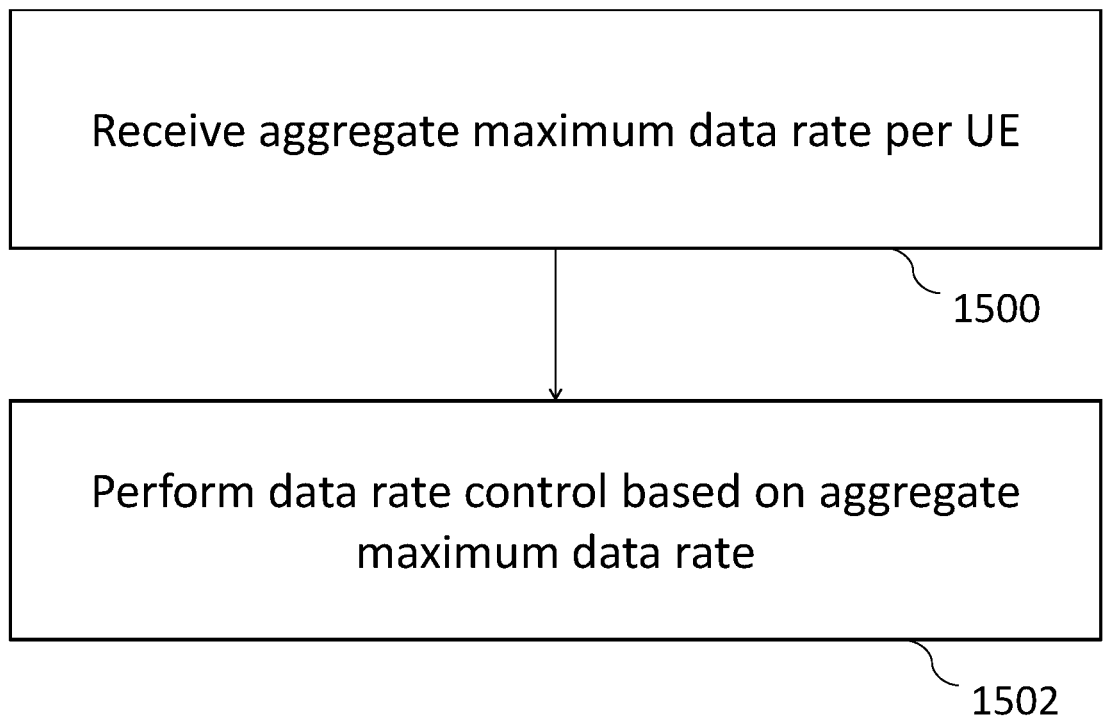
FIG. 15 shows a process according to an embodiment of the present disclosure.

FIG. 15 shows a process according to an embodiment of the present disclosure. The process shown in FIG. 15 may be used in a wireless network node (e.g. RAN or NG-RAN) and comprise the following steps:

Step 1500: Receive an aggregate maximum data rate per UE; and

Step 1502: Perform a data rate control based on the aggregate maximum data rate per UE.

Specifically, the wireless network node receives the aggregate maximum data rate per UE (e.g. slice specific aggregate maximum bit rate (AMBR)) from the network (e.g. core network) or another wireless network node. Note that, the aggregate maximum data rate is configured per UE may be configured per network slice (step 1500). Based on the received aggregate maximum data rate per UE, the UE performs the data rate control, e.g., on the basis of network slice.

In an embodiment of the slice specific AMBR is received from the core network, the slice specific AMBR is (comprised) in at least one of INITIAL CONTEXT SETUP REQUEST, PDU SESSION RESOURCE SETUP REQUEST, PDU SESSION RESOURCE MODIFY REQUEST or HANDOVER REQUEST.

In an embodiment, the wireless network node may receive the slice specific AMBR from another wireless network node (e.g. gNB). In an embodiment, the slice specific AMBR may be (comprised) in at least one of HANDOVER REQUEST, S-NODE ADDITION REQUEST, S-NODE MODIFICATION REQUEST, RETRIEVE UE CONTEXT RESPONSE. In an embodiment, the slice specific AMBR may be (comprised) in an inter-node radio resource control, RRC, message. For example, the inter-node RRC message may comprise at least one of HandoverCommand, HandoverPreparationInformation, CG-Config or CG-ConfigInfo.

In an embodiment, the wireless network node is a gNB-distributed-unit (gNB-DU) and receives the slice specific AMBR from a gNB-centralized-unit (gNB-CU). In this embodiment, slice specific AMBR is (comprised) in at least one of UE CONTEXT SETUP REQUEST or UE CONTEXT MODIFICATION REQUEST.

In an embodiment, the maximum UL and DL data rate per UE per slice (i.e. the slice specific AMBR) is taken into consideration in a session management function (SMF) to generate the session-AMBR (e.g. the maximum UL and DL data rate per UE per PDU session) and the wireless network node (e.g. RAN) enforces the session-AMBR in data rate control.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless terminal, the wireless communication method comprising:
   receiving, from a wireless network node, cell selection information associated with at least one network slice, and
   selecting a cell based on the cell selection information,
   wherein the cell selection information comprises at least one cell reselection priority associated to the at least one network slice,
   wherein the at least one network slice is categorized by a plurality of network slice groups and the at least one reselection priority is configured per network slice group,
   wherein the cell selection information comprises a group identification (ID) corresponding to the at least one reselection priority configured per network slice group,
   wherein the cell selection information is in a newly introduced system information.

2. The wireless communication method of claim 1, wherein the cell selection information is transmitted on demand.

3. A wireless communication method for use in a wireless communication node, the wireless communication method comprising:
  transmitting, to a wireless terminal, cell selection information associated with at least one network slice,
  wherein the cell selection information comprises at least one cell reselection priority associated to the at least one network slice,
  wherein the at least one network slice is categorized by a plurality of network slice groups and the at least one reselection priority is configured per network slice group,
  wherein the cell selection information comprises a group identification (ID) corresponding to the at least one reselection priority configured per network slice group,
  wherein the cell selection information is in a newly introduced system information.

4. The wireless communication method of claim 3, wherein the cell selection information is transmitted on demand.

5. A wireless terminal, comprising:
  at least one processor, and
  a memory, which is configured to store at least one program;
  wherein the at least one program, when executed by the at least one processor, enables the at least one processor to perform the wireless communication method of claim 1.

6. A wireless network node, comprising:
  at least one processor, and
  a memory, which is configured to store at least one program;
  wherein the at least one program, when executed by the at least one processor, enables the at least one processor to perform the wireless communication method of claim 3.

7. A computer program product comprising a non-transitory computer-readable program medium code stored thereupon, the code, when executed by a processor, causing the processor to implement a method recited in claim 1.

8. A computer program product comprising a non-transitory computer-readable program medium code stored thereupon, the code, when executed by a processor, causing the processor to implement a method recited in claim 3.

* * * * *